United States Patent [19]
McKee et al.

[11] Patent Number: 6,107,407
[45] Date of Patent: Aug. 22, 2000

[54] PROCESS FOR PREPARING OF MOULDING COMPOUNDS, MODIFIED BY ACRYLIC RUBBER, USING GROUPS INTRODUCED INTO SAID ACRYLIC RUBBER, WHICH GROUPS ARE DECOMPOSED BY A REDOX CONSTITUENT TO FORM RADICALS

[75] Inventors: Graham Edmund McKee; Bernhard Rosenau, both of Neustadt, Germany

[73] Assignee: BASF Aktiengesellschaft, Ludwigshafen, Germany

[21] Appl. No.: 09/202,092

[22] PCT Filed: Jun. 12, 1997

[86] PCT No.: PCT/EP97/03084

§ 371 Date: Dec. 9, 1998

§ 102(e) Date: Dec. 9, 1998

[87] PCT Pub. No.: WO97/47669

PCT Pub. Date: Dec. 18, 1997

[30] Foreign Application Priority Data

Jun. 13, 1996 [DE] Germany .............. 196 23 661

[51] Int. Cl.$^7$ .............. C08F 4/34; C08L 51/04
[52] U.S. Cl. .............. 525/263; 525/387; 525/308
[58] Field of Search ............... 525/263, 387, 525/308, 902

[56] References Cited

U.S. PATENT DOCUMENTS

| | | | |
|---|---|---|---|
| 3,691,260 | 9/1972 | Mittnacht et al. | 260/876 |
| 4,224,419 | 9/1980 | Swoboda et al. | 525/71 |
| 4,342,676 | 8/1982 | Ivanchev et al. | 524/458 |
| 4,397,992 | 8/1983 | Johansson et al. | 525/308 |
| 4,433,102 | 2/1984 | Brandstetter et al. | 525/75 |
| 4,442,263 | 4/1984 | Brandstetter et al. | 525/83 |
| 4,788,253 | 11/1988 | Hambrecht et al. | 525/83 |

FOREIGN PATENT DOCUMENTS

| | | |
|---|---|---|
| 001782 | 5/1979 | European Pat. Off. . |
| 095919 | 12/1983 | European Pat. Off. . |
| 143991 | 6/1985 | European Pat. Off. . |
| 2328004 | 5/1977 | France . |
| 120453 | 10/1975 | Germany . |
| 3149046 | 12/1981 | Germany . |
| 3206136 | 2/1982 | Germany . |
| 3227555 | 2/1984 | Germany . |
| 7103182 | 5/1965 | Japan . |
| 60210666 | 4/1984 | Japan . |
| 1138269 | 12/1968 | United Kingdom . |
| 90/03998 | 4/1990 | WIPO . |

OTHER PUBLICATIONS

Vollmert, *Die Angew. makro. chemie* 3 (1968) 1–27.
Echte, *Adv. in Chem.*, Series 222, ACS pp. 15–64, 1989.
*Chem. Abst.*, vol. 62, 1965, (DE 1182811; Dec. 03, 1964).
Illers, *Die Makro. Chem.*, 127 (1969) p. 1–33.
Fikentscher, *Cell. Chem.* 13 (1932) 58–64.
Elias, *Makromolekule*, vol. 1, pp. 450–451, 1988.
*Enc. of Pol. Sci. and Eng.*, vol. 13, pp. 762–776, 1988.

*Primary Examiner*—James J. Seidleck
*Assistant Examiner*—Olga Asinovsky
*Attorney, Agent, or Firm*—Keil & Weinkauf

[57] ABSTRACT

Molding materials modified with acrylic rubber are prepared by means of groups which are incorporated in the acrylic rubber and are decomposed by a redox component to give free radicals.

15 Claims, No Drawings

PROCESS FOR PREPARING OF MOULDING COMPOUNDS, MODIFIED BY ACRYLIC RUBBER, USING GROUPS INTRODUCED INTO SAID ACRYLIC RUBBER, WHICH GROUPS ARE DECOMPOSED BY A REDOX CONSTITUENT TO FORM RADICALS

The invention relates to a process for the preparation of molding materials modified with acrylic rubber, monomers which contain groups which are decomposed by a redox component to give free radicals being incorporated as polymerized units in the acrylic rubber, and molding materials prepared in this manner.

The preparation of rubber-modified molding materials has long been known. The use of elastomeric acrylate polymers having glass transition temperatures of less than 0° C. and preferably less than −10° C. (acrylic rubber) for molding materials modified in this manner has also been known for almost 40 years. Compared with the molding materials prepared using diene rubbers, they have improved weathering resistance. In the modified multiphase molding materials, domains of the rubber are embedded in a matrix of a thermoplastic, the domain structure playing an important role in determining the mechanical properties of the resulting molding materials. The toughness of the molding materials results from increased energy absorption during deformation up to fracture, energy being consumed for forming microcavities and for initiating conduction processes of the matrix polymer chains. The multiphase character is therefore an essential precondition for achieving such impact strengths.

There is still a great need for molding materials modified with acrylic rubber and in particular styrene/acrylonitrile copolymers modified with acrylic rubber (ASA molding materials), which have high impact strength and good flow properties. EP-0 095 919, EP-0 143 991, EP-0 438 418, JA-71 03 182, JA-60 21 0666, B. Vollmert, Die Angewandte makromolekulare Chemie 3 (1968), 1–27, and C. K. Riew, Rubber-Toughened Plastics, Advances in Chemistry Series 222, American Chemical Society, pages 15–64, describe the preparation of molding materials modified with acrylic rubber.

The preparation of ASA molding materials in emulsion is described in many publications in the patent literature (cf. for example, DE-A 19 11 882, DE-A 28 26 925, DE-A 31 29 378, DE-A 31 29 472, DE-A 31 49 046, DE-A 31 49 358, DE-A 32 06 136, DE-32 27 555). The disadvantage of this preparation in emulsion is the necessity of purifying the resulting relatively large amounts of water and the expensive essential removal of assistants in the working-up of the molding materials in order to avoid subsequent problems during processing (discoloration, speck formation, corrosion). The impact strength, tensile strength and gloss properties of shaped articles produced therefrom are also unsatisfactory.

DE-B 11 82 811 published more than 30 years ago discloses the polymerization of an acrylate together with a crosslinking monomer in solution for the preparation of a rubber-modified molding material, the monomers styrene and acrylonitrile to be grafted on being added after a monomer conversion of only from 20 to 40% by weight and the polymerization thereof then being carried out by solution or mass polymerization. Because the composition is not constant during the grafting reaction and owing to the incorporation of rubber units into the graft shell by polymerization, there is a reduction in the Vicat softening temperature and a deterioration of further mechanical properties of the resulting molding material.

In order to achieve a higher grafting yield in the grafting reaction, it is advantageous to incorporatg by polymerization, in the preparation of the acrylic rubber, comonomers with groups which undergo cleavage to give free radicals in the subsequent grafting reaction. EP-0 001 782 describes a process for the preparation of impact-resistant and ageing-resistant graft copolymers, monomers which contain peroxy groups, azo groups or labile C—C bonds being incorporated into an acrylic rubber by polymerization and then undergoing cleavage with thermal initiation and forming the graft shell with monomers forming hard polymers. Since the decomposition of the groups forming free radicals requires elevated temperatures, the polymerization of the monomers forming the graft shell is also thermally initiated so that the grafting yield is not optimum owing to the resultant smaller available amount of monomer. In order further to improve the mechanical properties of the resulting molding materials modified with acrylic rubber, it is desirable to suppress the thermal initiation of the monomers forming the graft shell in favor of the initiation by the groups forming free radicals.

The initiation with redox initiators by reaction of a reducing agent with an oxidizing agent is described in H. G. Elias, Makromoleküle Vol. 1, page 450, Hüthig & Wepf Verlag, and Encyclopedia of Polymer Science and Engineering, Vol. 13, pages 762–776, Verlag John Wiley & Sons, 1988. Monomers containing peroxide can be decomposed with a reducing agent or activator to give polymerization-initiating free radicals, the required activation energy being smaller than that for the purely thermal decomposition of peroxides, so that polymerizations can be initated at lower temperatures.

It is an object of the present invention to provide a process for the preparation of molding materials modified with acrylic rubber and having improved properties, in particular higher impact strengths, notched impact strengths and hole impact strengths, in combination with good flowability.

We have found that this object is achieved if a modified acrylic rubber which contains polymerized units of at least one monomer containing peroxy groups is prepared and the acrylic rubber is dissolved or swollen in the monomers forming the hard graft shell and the graft polymerization is initiated in this mixture by using a redox system which comprises the polymerized monomers containing peroxy groups and at least one reducing agent.

The present invention therefore relates to a process for the preparation of molding materials F, modified with acrylic rubber, by
(a) copolymerization of a mixture A, which contains
(a1) at least one alkyl acrylate and/or alkyl methacrylate (Am1) of the formula (I)

$$CH_2=CR^1-COOR^2 \qquad (I)$$

where
$R^1$ is hydrogen or methyl and
$R^2$ is alkyl of 1 to 32 carbon atoms,
(a2) at least one peroxy-containing monomer (Am2) having a copolymerizable C=C double bond and
(a3) if required, a further monomer (Am3) having two or more copolymerizable C=C double bonds and/or
(a4) if required, at least one additional, copolymerizable, olefinically unsaturated monomer (Am4),
with substantial retention of the peroxy groups of the monomers (Am2), to give an acrylic rubber B,
(b) dissolution or swelling of the acrylic rubber B in one or more olefinically unsaturated monomers (Cm) forming the hard graft shell to give a mixture C, and
(c) polymerization of the mixture C to give the molding material F modified with acrylic rubber in one or more stages, the polymerization being carried out, at least in the first stage and up to a conversion of more than 15% by weight of the monomers, by mass or solution polymerization under conditions under which the peroxy groups of the polymerized monomers (Am2) which form free radicals undergo cleavage, wherein, in the polymerization of the mixture C, the decomposition of the peroxy groups in the acrylic rubber B is initiated by using a redox system which comprises the polymerized monomers (Am2) and at least one reducing agent R.

Alkyl acrylates (Am1) and/or alkyl methacrylates (Am1) suitable for the preparation of the acrylic rubber B are esters of acrylic and/or methacrylic acid with alcohols of 1 to 32, preferably 1 to 18, particularly preferably 1 to 8, carbon atoms.

Examples of alkyl groups $R^2$ of 1 to 32 carbon atoms are methyl, ethyl, n-propyl, iso-propyl, n-butyl, iso-butyl, tert-butyl, n-pentyl, iso-pentyl, n-hexyl, n-heptyl, n-octyl, ethylhexyl, n-nonyl, n-decyl, n-dodecyl, n-tetradecyl, n-hexadecyl, n-octa-decyl, n-eicosyl, n-docosyl, n-tetracosyl, n-hexacosyl, n-octacosyl, n-triacontyl, n-hentriacontyl and dotriacontyl.

Preferred alkyl groups $R^2$ are n-butyl and 2-ethylhexyl. The glass transition temperature $T_g$ of the resulting acrylic rubber B can be established by the choice of acrylates, methacrylates or mixtures thereof, and the glass transition temperature $T_g$ should be less than 0° C., preferably less than −10° C. This establishment of the glass transition temperature is based on the fact that the glass transition temperature of acrylate and methacrylate polymers initially decreases with the increasing length of the side chains, passes through a minimum at $C_7$-alkyl acrylate or $C_{10}$-alkyl methacrylate and then increases again. The glass transition temperature can be determined by means of the DSC method (K. H. Illers, Makromolekulare Chemie 127 (1969), 1, or according to ASTM 3418). The content of alkyl acrylate monomers (Am1) in the acrylic rubber B is at least 30, preferably at least 60, particularly preferably at least 90, % by weight.

The mixture A contains at least one peroxy-containing monomer (Am2) having a copolymerizable C=C double bond, capable, on initiation, for example thermal decomposition, of forming free radicals, and hence acting as a free radical initiator in the polymerization of the mixture C in order to increase the grafting yield. The thermally labile monomer (Am2) should therefore form no free radicals or only a small amount of free radicals in its own copolymerization for the preparation of the acrylic rubber B. In the case of the groups incorporated according to the invention and forming the free radicals, the temperature at which they have a half-life of one hour is so high that they are stable in the process before the polymerization of the mixture C. The polymerization of the mixture C takes place in particular at from 80 to 200° C., preferably from 90 to 150° C. The determination of the temperature at which the monomers (Am2) have a half-life of one hour is described in the brochure Initiators for Polymer Production of AKZO. Examples of suitable monomers (Am2) which contain these groups are tert-butyl 3-isopropenylcumyl peroxide, tert-butyl peroxycrotonate and tert-butyl monoperoxymaleate, the first two preferably being used.

Further monomers (Am3) having at least two olefinically unsaturated double bonds may be used for the preparation of the acrylic rubber B. Examples of such further comonomers (Am3) are allyl(meth)acrylate, 1,4-butanediol di(meth) acrylate, divinylbenzene, triallyl cyanurate and dihydrocyclopentadienyl(meth)acrylate. Allyl (meth) acrylate and dihydrocyclopentadienyl(meth)acrylate are preferred.

Examples of further monomers (Am4) which may be used for the preparation of the acrylic rubber B are styrene, acrylonitrile, acrylic acid, methacrylic acid, derivatives of the two last-mentioned ones, such as methyl methacrylate, acrylamide, methacrylamide, derivatives of acrylamide and of methacrylamide, such as N-methylolacrylamide, N-methylolmethacrylamide and their ethers and esters, for example their methyl ethers, butyl ethers or acetates, and glycidyl acrylate, glycidyl methacrylate, maleic anhydride or maleimide.

The mixture A contains up to 60, preferably up to 40, % by weight of these monomers (Am3, Am4).

In a preferred embodiment of the novel process, the mixture A contains

30–99% by weight of the alkyl acrylate or methacrylate (Am1), 0.05–10% by weight of the peroxy-containing monomer (Am2) and 0–60% by weight of the monomers (Am3, Am4) particularly preferably 36–99.5% by weight of the alkyl acrylate or methacrylate (Am1), 0.1–4% by weight of the peroxy-containing monomer (Am2), and 0–60% by weight of the monomers (Am3, Am4).

The copolymerization of the monomers (Am1) with (Am2) and, if required, (Am3) and/or (Am4) can be carried out in a known manner and is preferably initiated by means of free radical initiators.

After the preparation and any required isolation of the acrylic rubber B, the latter is, according to the invention, dissolved or swollen in the monomer or monomers (Cm) forming the grafts and the hard matrix.

Examples of suitable monomers (Cm) are styrene, α-methylstyrene, further styrene derivatives and acrylonitrile, if necessary modified with small amounts of acrylic acid, methacrylic acid, derivatives of the last two, such as methyl methacrylate, acrylamide, methacrylamide and derivatives of acrylamide and of methacrylamide, such as acrylamidomethylol methyl ether, N-methylolacrylamide, methacrylamido methylol methyl ether, N-methylolmethacrylamide, methacrylamido-N-methylol butyl ether and methacrylamido-N-methylol acetate, and glycidyl acrylate and glycidyl methacrylate, maleic anhydride and maleimide.

Preferred monomers (Cm) are styrenes of the formula:

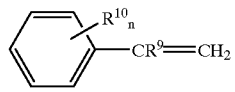

where $R^9$ and $R^{10}$ may be identical or different and may each be hydrogen or $C_1$–$C_8$-alkyl and n may be from 0 to 4, and acrylonitrile and/or methyl (meth)acrylate.

Styrene and acrylonitrile are particularly preferred, so that in particular ASA molding materials can be prepared by the novel process.

The polymerization of the monomer or monomers (Cm) in the presence of the acrylic rubber B dissolved or swollen in the monomers (Cm), i.e. the polymerization of the mixture C, is carried out as a free radical polymerization, initiation being effected by decomposition of the peroxy groups of the monomers (Am2), incorporated as polymerized units in the acrylic rubber, by adding a reducing agent R. According to the invention, the peroxy groups of the monomer (Am2) which are incorporated as polymerized units in the acrylic rubber B and one or more reducing agents R added to the mixture C form a redox system.

Advantageously, it has now been found that, by using such a redox system, the graft polymerization of the monomers (Cm) takes place at a lower temperature than when no redox systems are used. Surprisingly, it was also observed that the use of the redox system results in a much higher flowability of the molding materials without the impact strength deteriorating markedly. A possible reason for this is that the thermal initiation of monomers (Cm) is suppressed at these low temperatures and only initiation by the peroxides takes place. Since these peroxides are incorporated into the polymer chain, this initiation leads to a higher grafting yield. If these peroxides are decomposed at a higher temperature, i.e. without a redox system, the available amount of monomer is smaller than in the case of the decomposition at lower temperatures with a redox system since part of the monomer has already polymerized by thermal initiation. If a small amount of monomer is available, the grafting yield of the monomers (Cm) onto the rubber B is then presumably lower.

Preferred redox partners for peroxides are mono- and polymeric, primary, secondary and tertiary amines, for example

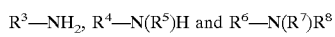

$R^3-NH_2$, $R^4-N(R^5)H$ and $R^6-N(R^7)R^8$ where $R^3$ to $R^8$ are each an alkyl, cycloalkyl or aromatic group of 1 to 100 carbon atoms, and diamines, such as N,N-dimethylaniline, and polyamines, such as tetraethylenepentamine. One or more metal ions, preferably transition metal ions, may furthermore be used as redox partners.

The polymerization of the mixture C can be carried out either by mass polymerization or by solution polymerization throughout, or it may be continued and completed by suspension polymerization after a conversion of more than 15%.

The molding material F obtained after the polymerization of the mixture C, which includes a graft polymerization of monomers (Cm) onto the acrylic rubber B, contains in general from 1 to 60, in particular from 5 to 40, % by weight of the acrylic rubber B. The upper limit of the acrylic rubber content is determined by the fact that, in spite of the embedded domains of the rubber, the molding material F must have sufficient strength. The lower limit is essentially determined by the molding material absorbing sufficient energy during deformation. In the molding material F, the acrylic rubbers occur in grafted form as particles having a diameter of from 0.1 to 20 µm, preferably from 0.1 to 10 µm.

The molding materials prepared according to the invention have good impact strength and improved flow behavior.

The invention is illustrated by the following, nonrestrictive examples of preferred novel embodiments and comparative experiments.

In the examples which follow, percentages are by weight.

The values for the impact strength in $kJ/m^2$ were determined according to DIN 53 453-n, 5/75 edition.

The flow behavior and hence the processibility were assessed on the basis of the melt volume index in ml/10 min, which was measured according to DIN 53735 at 200° C. and under a load of 21.6 kg.

The products were injection molded at a melt temperature of 240° C. and a mold temperature of 60° C. to give standard small bars.

tert-Butyl peroxicrotonate has a half-life of one hour at 110° C. and tert-butyl 3-isopropenylcumyl peroxide has a half-life of one hour at 139° C.

EXAMPLE 1

According to the Invention a) Preparation of the acrylic rubber 3370 g of cyclohexane were introduced into a flask, placed under nitrogen and heated to 75° C. with stirring, and 77 ml of feed 1 and 8 ml of feed 2 were then initially added. After 15 minutes, the remainder of the two feeds were added in the course of about 4 hours. At a conversion of 94.7%, determined by measurement of the solids content, the experiment was cooled and stopped.

Feed 1

1500 g of n-butylacrylate 13.02 g of allyl methacrylate 26.4 g of tert-butyl peroxicrotonate Feed 2

80 ml of acetone 80 ml of toluene 1636 mg of 2,2'-azobisisobutyronitrile (AIBN)

b) Preparation of the molding material with the acrylic rubber

The cyclohexane of the preceding step was removed under reduced pressure in a rotary evaporator and was exchanged for a certain amount of styrene, after which acrylonitrile was added in an amount such that a mixture C comprising 69.2% by weight of styrene, 23% by weight of acrylonitrile and 7.8% by weight of acrylic rubber formed. 1923 g of this solution were introduced, together with 0.44 g of tetraethylenepentamine, into a 5 l steel kettle and were heated to 70° C. under nitrogen and with stirring. At a conversion of 20%, 1.92 g of tert-dodecyl mercaptan and 2.31 g of octadecyl 3-(3,5-di-tert-butyl-4-hydroxyphenyl) propionate (commercial antioxidant) were added. At a conversion of about 35%, 2000 g of water, 20 g of polyvinylpyrrolidone having a K value of 90 (measured according to E. Fikentscher, Cellulose-chemie 13 (1932), 58–64), 2.0 g of tetrasodium diphosphate and 59.8 g of a 10% strength aqueous solution of a commercial polyvinyl alcohol (hydrolyzed polyvinyl acetate having an average degree of polymerization of 30 and a degree of hydrolysis of 92%) were added. The polymerization batch was polymerized for 3 hours at 110° C., for 3 hours at 130° C. and for 6 hours at 140° C. Thereafter, the batch was cooled and the polymer was filtered off and dried.

Certain properties of the resulting molding material F are shown in Table 1.

EXAMPLE 2

According to the Invention

The procedure was as in Example 1, except that 0.75 g of N,N-di-methylaniline was used instead of 0.44 g of tetraethylenepentamine. Certain properties of the resulting molding material F are shown in Table 1.

EXAMPLE 3

Comparison

The procedure was as in Example 1, but without the addition of tetraethylenepentamine in the preparation of the molding material F with the acrylic rubber B. The initial temperature of 70° C. was therefore increased to 95° C. in the preparation of the molding material F. Certain properties of the resulting molding material F are shown in Table 1.

EXAMPLE 4

Comparison a) Preparation of the acrylic rubber 1685 g of cyclohexane were introduced into a flask, placed under nitrogen and heated to 75° C. with stirring, after which 39 ml of feed 1 and 4 ml of feed 2 were initially added. After 15 minutes, the remainder of the two feeds were added in the course of about 4 hours. At a conversion of 90%, cooling was carried out and the experiment was stopped.

Feed 1
750 g of n-butyl acrylate
6.12 g of allyl methacrylate
13.2 g of tert-butyl peroxicrotonate
7.50 g of tert-butyl-3-isopropenylcumyl peroxide
Feed 2
40 ml of acetone
40 ml of toluene
818 mg of 2,2'-azobisisobutyronitrile (AIBN)

b) Preparation of the molding material with the acrylic rubber

The cyclohexane of the preceding step was removed under reduced pressure in a rotary evaporator and was exchanged for a certain amount of styrene, after which acrylonitrile was added in an amount such that a mixture comprising 69.2% by weight of styrene, 23% by weight of acrylonitrile and 7.8% by weight of acrylic rubber formed. 1923 g of this solution were introduced, together with 1.92 g of tert-dodecyl mercaptan and 2.31 g of octadecyl 3-(3, 5-di-tert-butyl-4-hydroxyphenyl)propionate (commercial antioxidant), into a 5 l steel kettle, placed under nitrogen and heated to 90° C. with stirring. At a conversion of about 40%, 2000 g of water, 20 g of polyvinylpyrrolidone having a K value of 90 (measured according to E. Fikentscher Cellulosechemie 13 (1932), 58–64), 2.0 g of tetrasodium diphosphate and 59.8 g of a 10% strength aqueous solution of a commercial polyvinyl alcohol (hydrolyzed polyvinyl acetate having an average degree of polymerization of 30 and a degree of hydrolysis of 92%) were added.

The polymerization batch was polymerized for 3 hours at 110°°C., for 3 hours at 130° C. and for 6 hours at 140° C. Thereafter, the batch was cooled and the polymer was filtered off and dried. Certain properties of the resulting molding material F are shown in Table 1.

EXAMPLE 5

According to the Invention

The procedure was as in Example 4, except that 3.3 g of tetraethylenepentamine were also added when filling the steel kettle in the preparation of the molding material F with the acrylic rubber B. Certain properties of the resulting molding material F are shown in Table 1.

TABLE 1

| Example | Impact strength kJ/m$^2$ | Melt volume index (MVI) ml/10 min |
|---|---|---|
| 1 (according to the invention) | 24 | 16 |
| 2 (according to the invention) | 23 | 18 |
| 3 (comparison) | 24 | 1.0 |
| 4 (comparison) | 25 | <1 |
| 5 (according to the invention) | 25 | 5.2 |

As is evident from Table 1, the use of a novel redox system leads to products having better flowability, the mechanical properties being unchanged.

We claim:

1. A process for the preparation of an acrylic rubber-modified ethylenic polymer or copolymer molding material F by
    (a) copolymerization of a mixture A, which contains
        (a1) at least one alkyl acrylate or alkyl methacrylate (Am1) of the formula (I)

$$CH_2=CR^1-COOR^2 \qquad (I)$$

where
            $R^1$ is hydrogen or methyl and
            $R^2$ is alkyl of 1 to 32 carbon atoms,
        (a2) at least one peroxy-containing monomer (Am2) having a copolymerizable C=C double bond and
        (a3) optionally, a further monomer (Am3) having two or more copolymerizable C=C double bonds or
        (a4) optionally, at least one addition, copolymerizable, olefinically unsaturated monomer (Am4),
    with substantial retention of the peroxy groups of the monomers (Am2), to give an acrylic rubber B,
    (b) dissolution or swelling of the acrylic rubber B in one or more olefinically unsaturated monomers (Cm) forming the hard graft shell to give a mixture C, and
    (c) polymerization of the mixture C to give said molding material F in one or more stages, the polymerization being carried out, at least in the first stage and up to a conversion of more than 15% by weight of the monomers, by mass or solution polymerization under conditions under which the peroxy groups of the polymerized monomers (Am2) which form free radicals undergo cleavage,
    wherein, the polymerization of the mixture C is initiated by a redox system which comprises the polymerized peroxy group-containing monomers (Am2) and at least one reducing agent R.

2. A process as claimed in claim 1, wherein the reducing agent R used comprises one or more amines.

3. A process as claimed in claim 1, wherein the reducing agent R used comprises one or more metal ions.

4. A process as claimed in claim 1 wherein $R^2$ is alkyl of 1 to 18, carbon atoms.

5. A process as claimed in any of claim 1 wherein the alkyl acrylate (Am1) used is n-butyl acrylate or ethylhexyl acrylate.

6. A process as claimed in claim 1, wherein tert-butyl 3-isopropenylcumyl peroxide, tert-butyl peroxicrotonate or tert-butyl monoperoxymaleate is used as monomers (Am2).

7. A process as claimed in claim 1, wherein allyl (meth) acrylate or dihydrocyclopentadienyl acrylate is used as monomers (Am3).

8. A process as claimed in claim 1, wherein styrene, acrylonitrile or methyl (meth)acrylate is used as additional monomers (Am4).

9. A process as claimed in claim 1, wherein styrene, acrylonitrile or methyl methacrylate is used as monomers (Cm).

10. A process as claimed in claim 1, wherein the monomer mixture A contains
    from 30 to 99.95% by weight of the alkyl acrylate or methacrylate (Am1),
    from 0.05 to 10% by weight of at least one of the monomers (Am2) and
    from 0 to 60% by weight of at least one of the monomers (Am3) or (Am4).

11. A process as claimed in claim 1, wherein the acrylic rubber B has a glass transition temperature of less than 0° C.

12. A process as claimed in claim 1, wherein said molding material F produced contains from 1 to 60% by weight, based on the total amount of the molding material F of said acrylic rubber B is prepared.

13. A process as claimed in claim 1, wherein the polymerization of the mixture C is continued by suspension polymerization after a conversion of at least 15%.

14. An acrylic rubber-modified ethylenic polymer or copolymer molding material F produced by the process of claim 1.

15. The molding material F of claim 14, wherein the rubber particles in the polymer matrix have a diameter of from 0.1 to 20 μm.

UNITED STATES PATENT AND TRADEMARK OFFICE
CERTIFICATE OF CORRECTION

PATENT NO.: 6,107,407

DATED: August 22, 2000

INVENTOR(S): McKEE et al.

It is certified that error appears in the above-identified patent and that said Letters Patent is hereby corrected as shown below:

Col. 8, claim 4, line 28, "1 wherein" should be --1, wherein--.

Col. 8, claim 5, line 30, "any of claim 1 wherein" should be --claim 1, wherein--.

Signed and Sealed this

Twenty-ninth Day of May, 2001

Attest:

NICHOLAS P. GODICI

*Attesting Officer*        *Acting Director of the United States Patent and Trademark Office*